United States Patent [19]
Heimann et al.

[11] Patent Number: 5,297,735
[45] Date of Patent: Mar. 29, 1994

[54] HAND SHOWER

[75] Inventors: Bruno Heimann, Föndenberg-Ardey; Eckhard Gransow, Fröndenberg; Rudolf Haufe, Menden; Bernd Bischoff, Iserlohn, all of Fed. Rep. of Germany

[73] Assignee: Friedrich Grohe Aktiengesellschaft, Hemer, Fed. Rep. of Germany

[21] Appl. No.: 884,396

[22] Filed: May 15, 1992

[30] Foreign Application Priority Data

May 24, 1991 [DE] Fed. Rep. of Germany ....... 4116932

[51] Int. Cl.⁵ .............................................. B05B 9/00
[52] U.S. Cl. .................................. 239/120; 239/530; 239/600
[58] Field of Search ................... 285/38, 39, 317, 319; 239/600, 588, 525, 530

[56] References Cited

U.S. PATENT DOCUMENTS

| | | | |
|---|---|---|---|
| 994,230 | 6/1911 | Yancey | 285/38 X |
| 2,586,480 | 2/1952 | Ras | 239/120 X |
| 3,637,143 | 1/1972 | Shames et al. | 239/530 X |
| 4,126,335 | 11/1978 | Voss | 285/39 |
| 4,209,190 | 6/1980 | Fleischer | 285/38 |
| 4,501,441 | 2/1985 | Crews | 285/143 |
| 4,607,795 | 8/1986 | Ettlinger et al. | 239/588 X |
| 4,653,778 | 3/1987 | Alandy | 285/39 X |

FOREIGN PATENT DOCUMENTS

| | | |
|---|---|---|
| 2731525 | 1/1978 | Fed. Rep. of Germany . |
| 2827847 | 1/1980 | Fed. Rep. of Germany . |
| 2827847A1 | 1/1980 | Fed. Rep. of Germany . |
| 2450589 | 10/1980 | France . |
| 2654489 | 5/1991 | France . |
| WO9010814 | 9/1990 | PCT Int'l Appl. . |

*Primary Examiner*—Andres Kashnikow
*Assistant Examiner*—Kevin P. Weldon
*Attorney, Agent, or Firm*—Herbert Dubno; Andrew Wilford

[57] ABSTRACT

A hand shower has a shower housing having an inner end formed centered on an axis with an axially open central recess and an outer end carrying a shower head. A male coupling part adapted to be fixed to the end of a supply hose has a tubular outlet end engageable axially in the housing inner end. A latch element can be displaced radially of the axis in the inner end between a holding position engaging and axially retaining the coupling part in the recess and a freeing position allowing the coupling part to move axially freely into and out of the recess. The housing has a central feed tube forming the inner and outer ends and at least one rigid outer housing part surrounding and completely enclosing the central feed tube. Furthermore the shower includes a pair of such latch elements radially oppositely displaceable between the positions. These elements can be fitted without soldering or fusing into the housing for a very inexpensive and simple assembly of the device.

14 Claims, 5 Drawing Sheets

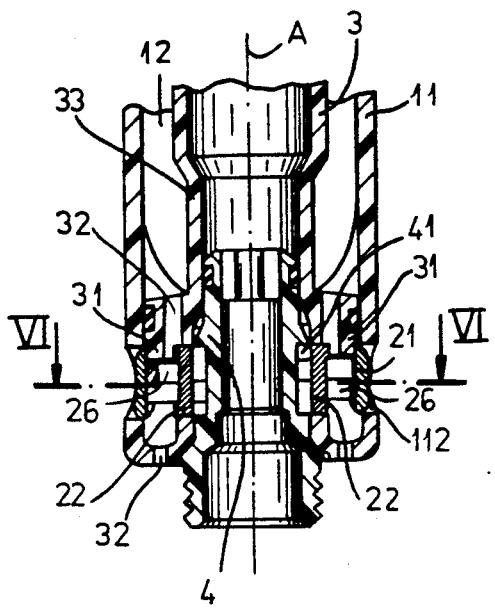 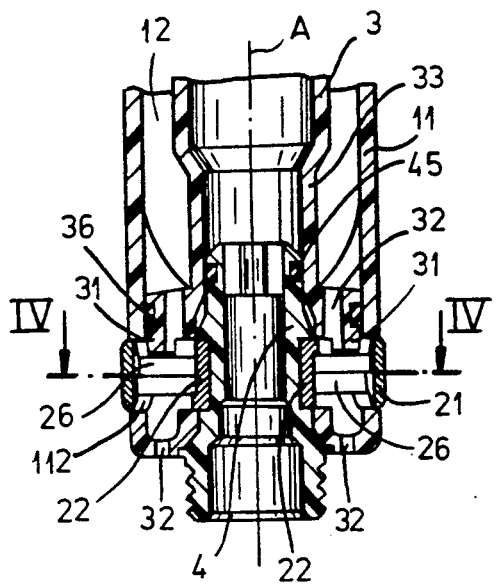
FIG.5  FIG.3
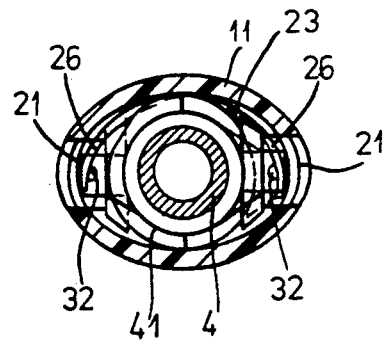 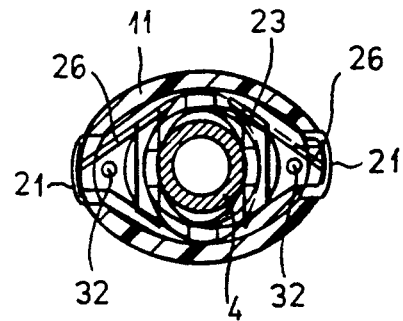
FIG.6  FIG.4

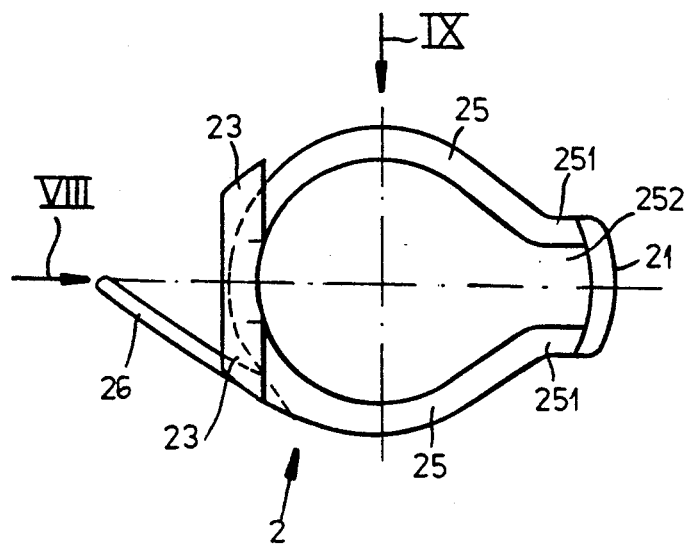
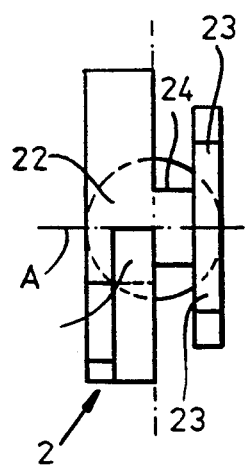
FIG 7  FIG.8
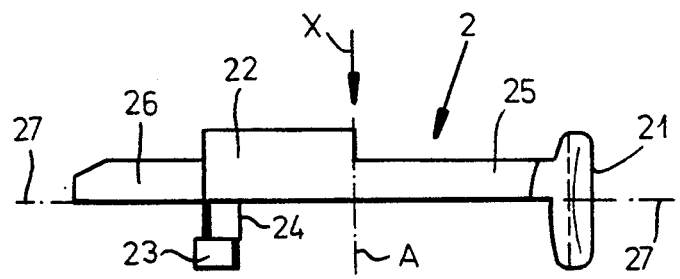
FIG.9
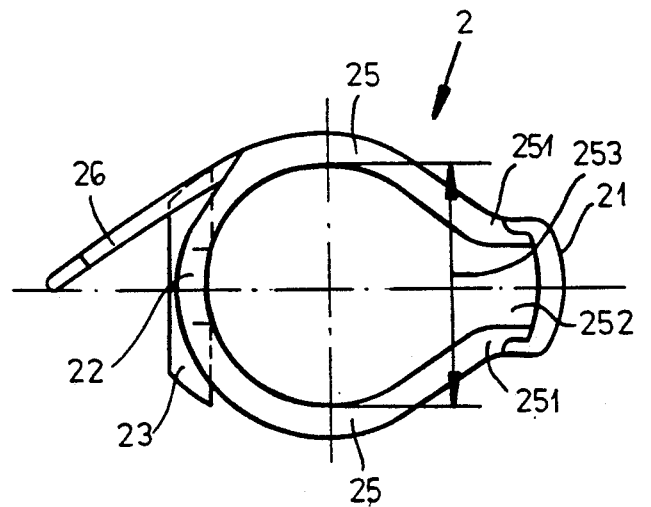
FIG.10

5,297,735

HAND SHOWER

FIELD OF THE INVENTION

The present invention relates to a shower. More particularly this invention concerns a hand shower that is normally mounted on the end of a flexible hose.

BACKGROUND OF THE INVENTION

A standard hand shower such as described in German patent document 2,827,847 filed on 24 Jun. 1978 by H. J. Schmidt has a short tubular male element that is screwed onto the lower end of the hand shower and that can be fitted in a female snap coupling that in turn is screwed onto the outer end of the feed hose. Buttons on the female part of the coupling can be pressed to release the male part of the device and allow the hand shower to be switched for one offering a different spray pattern or other features.

The disadvantage of this arrangement is that a rather bulky assembly is interposed between the rear end of the hand shower and the outer end of the hose. This coupling adds to the size of the assembly. In addition the connection thread on the hand shower necessitates a connecting element of the coupling which is circular in section so that the location at which it is screwed tight is independent of the angular position. Finally it is not uncommon for hand showers to vary widely in dimensions, so that the coupling supplier must stock a large number of the couplings in order to match the shape and size of the various couplings.

OBJECTS OF THE INVENTION

It is therefore an object of the present invention to provide an improved hand shower.

Another object is the provision of such an improved hand shower which overcomes the above-given disadvantages, that is which substantially reduces the bulk of the coupling assembly while otherwise improving on the existing systems.

SUMMARY OF THE INVENTION

A hand shower according to the invention has a shower housing having an inner end formed centered on an axis with an axially open central recess and an outer end carrying a shower head. A male coupling part adapted to be fixed to the end of a supply hose has a tubular outlet end engageable axially in the housing inner end. A latch element can be displaced radially of the axis in the inner end between a holding position engaging and axially retaining the coupling part in the recess and a freeing position allowing the coupling part to move axially freely into and out of the recess.

Thus with this system the coupling is integrated right into the hand shower so it eliminates the need for a separate snap coupling. The separate housing for the latch element can be completely done away with and mounting in the housing does not appreciably increase the size of the housing.

Furthermore according to the invention the housing has a central feed tube forming the inner and outer ends and at least one rigid outer housing part surrounding and completely enclosing the central feed tube. Furthermore the shower includes a pair of such latch elements radially oppositely displaceable between the positions. These elements can be fitted without soldering or fusing into the housing for a very inexpensive and simple assembly of the device.

The latch elements of this invention are each formed with an actuating button and the housing is formed at the inner end with diametrally opposite ports through which the element buttons are exposed. The outlet end of the male coupling part is formed with a radially outwardly open groove into which the latch elements are engageable and the inner housing end is formed with a pair of axially spaced annular abutments between which the elements are engaged.

Each latch element according to the invention is unitarily formed of a resilient synthetic resin and each element is basically annular and is formed unitarily with a pair of relatively thin and easily deformable curved side parts each having two ends, a relatively thick latch part bridging the side parts between two of the ends thereof, and a pushbutton bridging the side parts between the other two ends thereof. Furthermore each element is basically centered in the inner end axis and is formed with an axially projecting web having an end provided with a widened cross piece and the side parts are laterally spaced by a maximum dimension slightly greater than the width of the cross piece. Each web of each element extends axially through the other element. This forms the two elements into a compact and easily handled unit that can be set into the housing between axially spaced abutments therein with no further mounting steps.

The pushbuttons of this system are circular and about 10 mm in diameter and the housing is formed at the inner end with circular holes about 10 mm in diameter through which the buttons are engaged. Each element has on its side opposite the respective pushbutton a resilient spring tongue bearing radially on the button of the other element and the side parts of the elements have cylindrical extensions forming a gap and in the freeing position the web of each element fits in the gap immediately adjacent the button of the other element.

The housing according to the invention includes a central feed tube forming the inner and outer ends, a rigid upper housing half, and a rigid lower housing half, the halves together enclosing the feed tube. In addition the lower housing half is provided at the inner end with an annular part completely surrounding the tube at the inner end and the upper housing half is formed with lugs hooked into the annular part. The housing has fasteners engaged at the outer end between the two housing halves and retaining same together. The tube fits snugly at the inner housing end in the lower housing half and the housing is formed at the lower end with drain holes.

BRIEF DESCRIPTION OF THE DRAWING

The above and other objects, features, and advantages will become more readily apparent from the following, reference being made to the accompanying drawing in which:

FIG. 3 is a larger-scale longitudinal section through the lower end of the shower in the latched position;

FIG. 4 is a section taken along line IV—IV of FIG. 3;

FIG. 5 is a view like FIG. 3 but in the unlatched position;

FIG. 6 is a section taken along line VI—VI of FIG. 5;

FIG. 7 is a top view of the latch element according to the invention;

FIGS. 8 and 9 are views taken in the directions of respective arrows VIII and IX of FIG. 7;

FIG. 10 is a view taken in the direction of arrow X of FIG. 9;

SPECIFIC DESCRIPTION

Figures 1, 2:
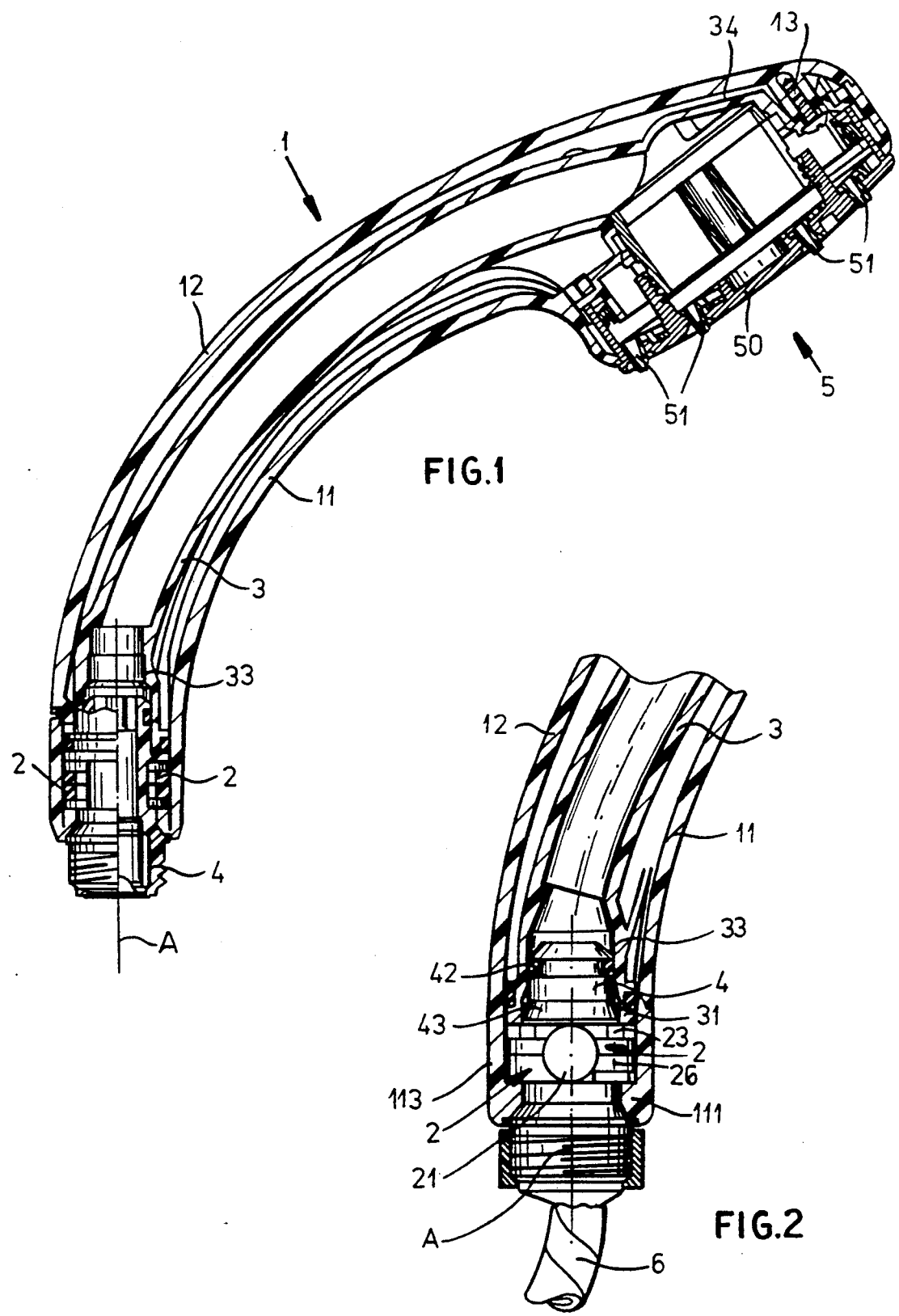
FIG. 1 is a longitudinal section through the hand shower according to the invention.
FIG. 2 is a larger-scale longitudinal section through a detail of the shower.
Figure 13:
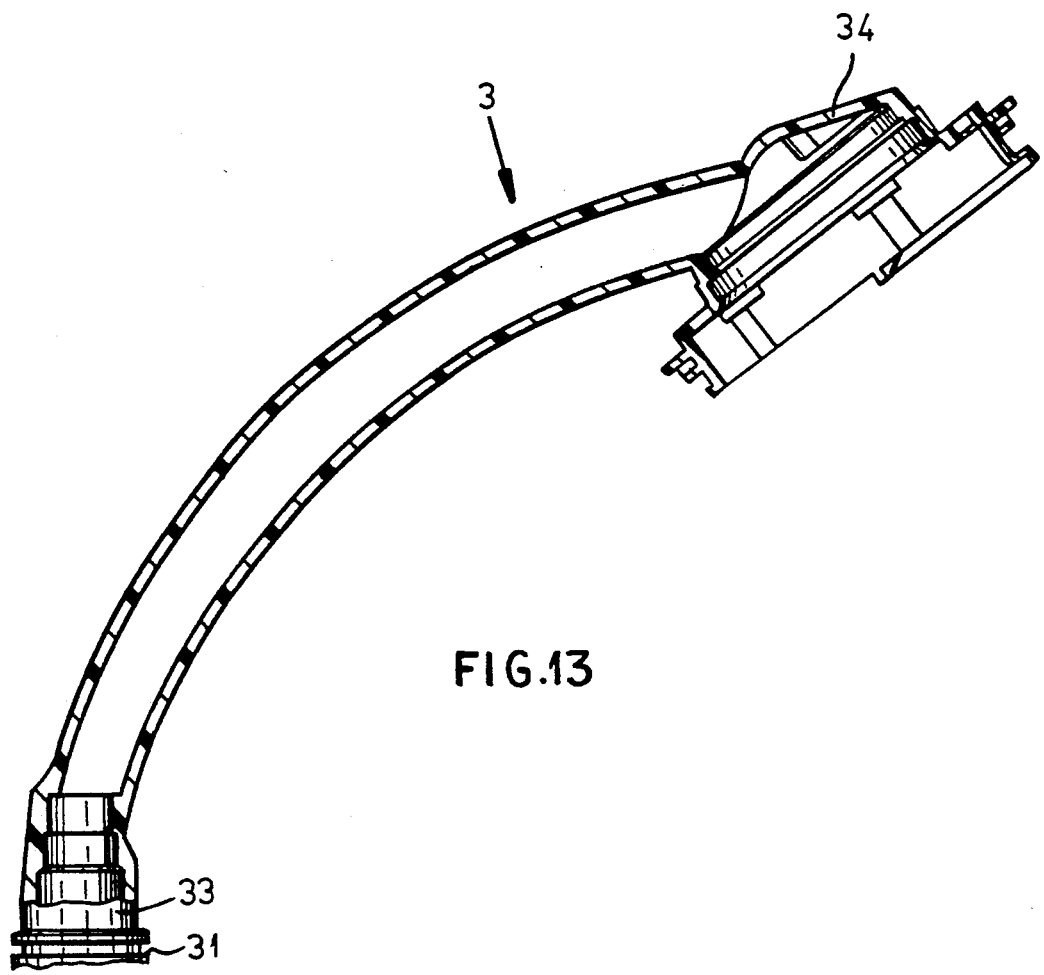
FIGS. 11, 12, and 13 are longitudinal sections through the upper housing half, the lower housing half, and the liner tube of the shower according to the invention.
Figure 14:
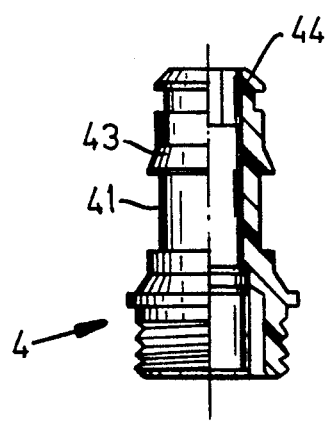
FIG. 14 is a side view partly in axial section through the male part or plug of the connector according to the invention.
Figure 11:
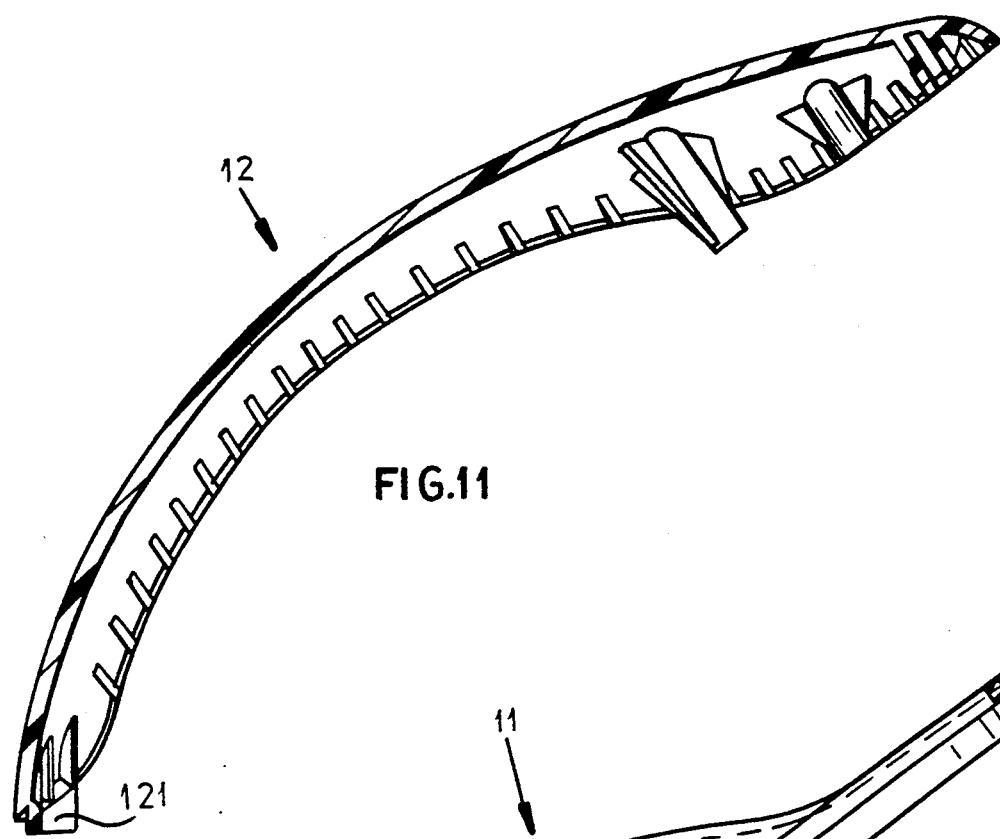
Figure 12:
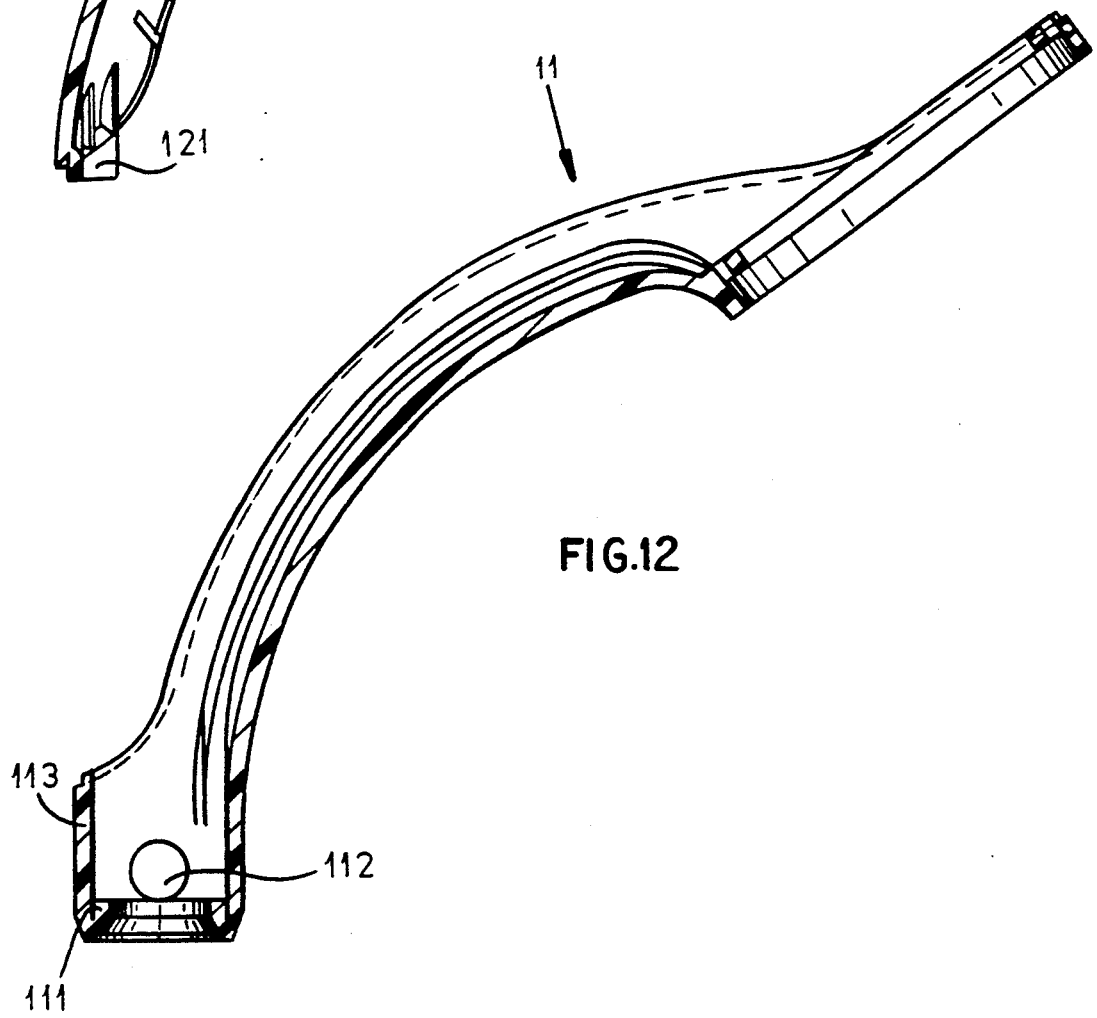

As seen in FIGS. 1 and 2 a hand shower according to this invention has a curved housing 1 formed of interfitting lower and upper parts 11 and 12 secured together by screws 13 and provided at its lower end with latch elements 2 for securing it to a male coupling part 4 and at its upper end with a shower head 5. A water-feed tube 3 in the housing has a lower end 33 shaped to fit snugly over the part 4 and an upper end 34 forming a seat for the head 5. This head 5 has an end wall 50 provided with an array of spray nozzles 51.

The two coupling elements 2 are identical and as shown in FIGS. 7 through 10 are each injection molded from a resilient synthetic resin. Each element 2 is basically annular, having a pair of part-circular side parts or legs 25 joined at one end to a thickened latch part 22 and at their opposite ends extended on a cylinder at 251 to a circular pushbutton 21 that is normally fitted in a respective 10 mm-diameter aperture 112 (FIGS. 3 and 5) formed in the tubular lower end 113 of the lower housing part 11.

Furthermore on its end opposite its button 27 each latching element 2 is formed with an outwardly projecting resilient spring finger 26, and with an axially directed connecting web 24 of limited width that carries a wide coupling lug 23 of a width equal to slightly less than the maximum spacing 253 between the two side parts 25. It is therefore possible to axially fit together two such elements 2 with each lug 23 passing between the legs 25 of the other element until the two flat faces 29 of the parts lie on one another. Once in this position the two elements can be pushed radially together to deform the spring tongues 26 until each web 24 fits in a recess 252 immediately inside each button 21. Once thus compressed together the axial stack of the two elements can be fitted in the lower end 113 of the lower housing part 11 until it is past an inwardly projecting rim 111 of same. The buttons 21 are aligned with the diametrally opposite holes 112, whereupon these buttons 21 can be released to assume positions each projecting slightly from the respective hole 22.

The lower end 33 of the water-feed tube 3 is shaped to fit around the upper part of the tubular part 4 and has an outwardly projecting rim 31 provided with an external O-ring 36 that snugly engages the tubular lower end 113 of the tube. In addition both this rim 31 and the lower end wall of the part 11 are formed with drain holes 32 to prevent any water from being trapped within the housing 1.

The part 4 is normally screwed into the end of a standard flexible hose 6 and has a frustoconical ridge 43 defining a radially outwardly open square-sided groove 41. Thus, to mount the housing 1 on the hose 5, the part 4 is simply poked into the lower end 113. The ridge 43 will oppositely outwardly deflect the two diametrally opposite latch formations 22 that are biased radially toward each other by the springs 26 until these formations 22 can snap toward each other back into the groove 41. Meanwhile an inner end 44 of the part 4 fitted with an O-ring 45 engages snugly in the tube end 33 to form a relatively tight seal therewith as shown in FIGS. 3 and 4. While this connection is water tight, it still permits limited rotation about the axis A of the housing 1 and coupling part 4.

To take the shower head off the part 4 the two buttons 21 are pressed diametrally together, thereby pushing the formations 22 apart as shown in FIGS. 5 and 6 until they move completely out of the notch 41. This completely unlatches the element 4 so that the shower head can be removed and replaced with another with a different spray pattern or other desired feature.

The upper housing part 12 is provided on its lower end with lugs 121 that fit within the tubular lower end 113 of the lower part 11. Thus the two parts can be closed together like a hinge about the lugs 121 to assemble the housing 1, whereupon the screws 13 are installed to permanently connect the parts 11 and 12 together. Since water does not normally directly contact the parts 11 and 12 before it exits from the shower head, these parts can be made of any material, normally plastic, that is wanted for design purposes. In addition the two parts 11 and 12 can even be of different colors for a two-tone effect.

We claim:

1. A hand shower comprising:
    a shower housing having an inner end formed centered on an axis with an axially open central recess and an outer end;
    a shower head on the outer end;
    a male coupling part adapted to be fixed to the end of a supply hose and having a tubular outlet end engageable axially in the housing inner end; and
    a pair of latch elements unitarily formed of a resilient synthetic resin and displaceable radially of the axis in the inner end and opposite to each other between a holding position engaging and axially retaining the coupling part in the recess and a freeing position allowing the coupling part to move axially freely into and out of the recess, each element being basically annular and being formed unitarily with
        a pair of relatively thin and easily deformable curved side parts each having two ends,
        a relatively thick latch part bridging the side parts between two of the ends thereof, and
        a pushbutton on the side parts at the other two ends thereof.

2. The hand shower defined in claim 1 wherein the housing includes
    a central feed tube forming the inner and outer ends, and
    at least one rigid outer housing part surrounding and completely enclosing the central feed tube.

3. The hand shower defined in claim 1 wherein the shower includes a pair of such latch elements radially oppositely displaceable between the positions.

4. The hand shower defined in claim 1 wherein the elements are each formed with an actuating button, the housing being formed at the inner end with diametrally opposite ports through which the element buttons are exposed.

5. The hand shower defined in claim 1 wherein the outlet end of the male coupling part is formed with a radially outwardly open groove into which the latch elements are engageable.

6. The hand shower defined in claim 1 wherein the inner housing end is formed with a pair of axially spaced annular abutments between which the elements are engaged.

7. The hand shower defined in claim 1 wherein each element is basically centered in the inner end axis and is formed with an axially projecting web having an end provided with a widened cross piece, the side parts being laterally spaced by a maximum dimension slightly greater than the width of the cross piece, each web of each element extending axially through the other element.

8. The hand shower defined in claim 1 wherein the pushbuttons are circular and about 10 mm in diameter, the housing being formed at the inner end with circular holes about 10 mm in diameter through which the buttons are engaged.

9. The hand shower defined in claim 1 wherein each element has on its side opposite the respective pushbutton a resilient spring tongue bearing radially on the button of the other element.

10. The hand shower defined in claim 1 wherein the side parts of the elements have cylindrical extensions forming a gap and in the freeing position the web of each element fits in the gap immediately adjacent the button of the other element.

11. The hand shower defined in claim 1 wherein the housing includes
 a central feed tube forming the inner and outer ends,
 a rigid upper housing half, and
 a rigid lower housing half, the halves together enclosing the feed tube.

12. The hand shower defined in claim 11 wherein the tube fits snugly at the inner housing end in the lower housing half.

13. The hand shower defined in claim 11 wherein the housing is formed at the lower end with drain holes.

14. A hand shower comprising:
 a shower housing including
  a central feed tube forming an inner end formed centered on an axis with an axially open central recess and an outer end,
  a rigid upper housing half,
  a rigid lower housing half, the halves together enclosing the feed tube, the lower housing half being provided at the inner end with an annular part completely surrounding the tube at the inner end, the upper housing half being formed with lugs hooked into the annular part, and
  fasteners engaged at the outer end between the two housing halves and retaining same together;
 a shower head on the outer end;
 a male coupling part adapted to be fixed to the end of a supply hose and having a tubular outlet end engageable axially in the housing inner end; and
 a latch element displaceable radially of the axis in the inner end between a holding position engaging and axially retaining the coupling part in the recess and a freeing position allowing the coupling part to move axially freely into and out of the recess.

* * * * *